Patented June 7, 1949

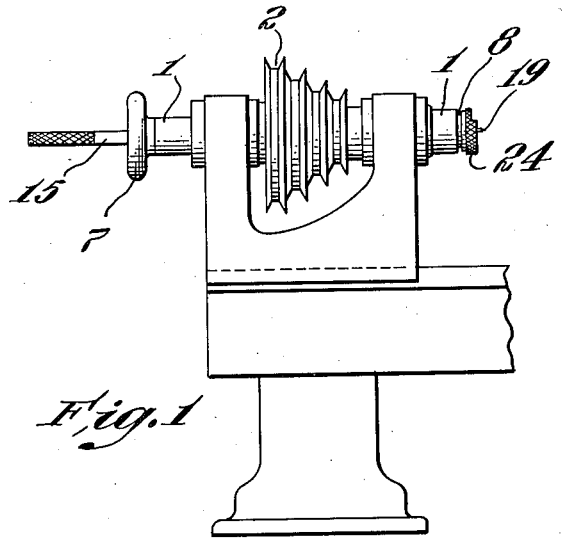
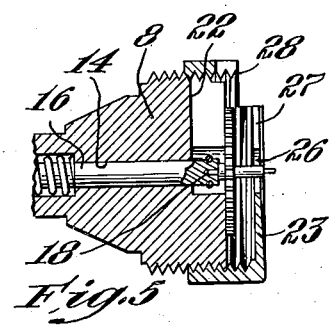
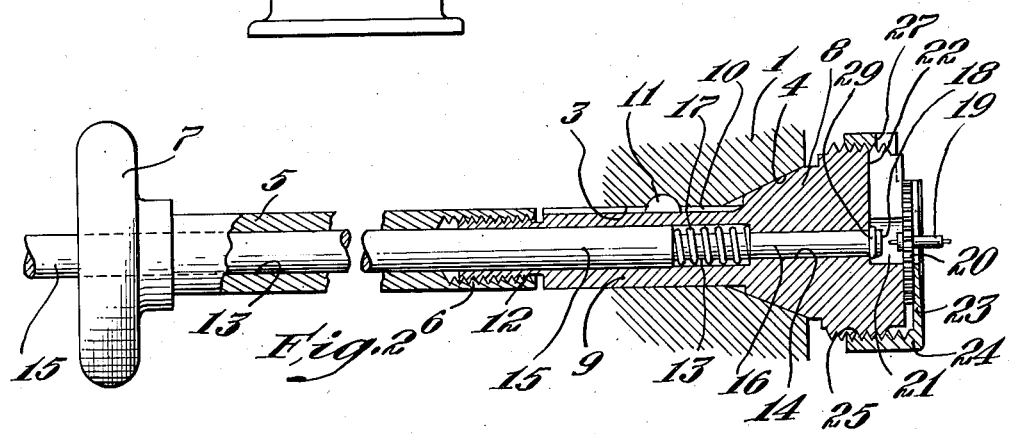
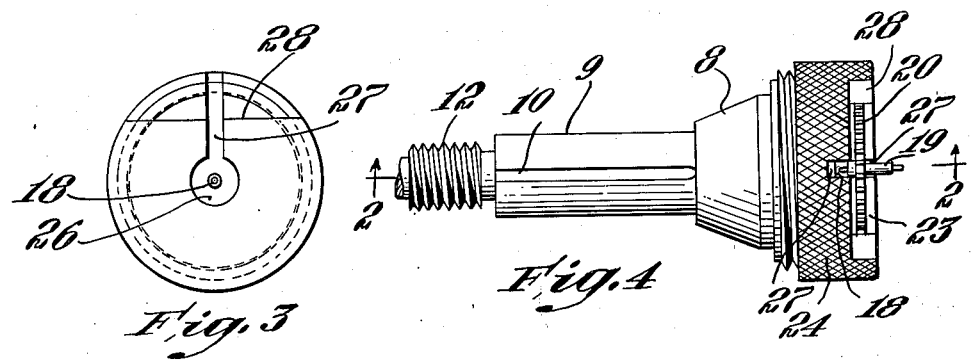

2,472,399

UNITED STATES PATENT OFFICE 2,472,399

POLISHING CHUCK

Gerard Bolduc, Manchester, N. H.

Application March 26, 1947, Serial No. 737,339

3 Claims. (Cl. 279—8)

This invention relates to a chuck for use on a lathe and more particularly a chuck for use on a watchmaker's precision lathe to hold a gear and a staff or shaft. As these chucks have been constructed heretofore, it has been necessary to remove the retaining cap in order to place the work piece in the chuck and in order to engage the shaft with the centering pin.

One object of the present invention is to permit the free insertion of a gear and staff into the chuck without the removal of the retaining cap. Another object is to permit the aforesaid insertion without interference by the centering pin.

The aforesaid objects are accomplished by providing peripheral and radial openings in the cap and in the rotary head large enough so that the work pieces may be inserted therein. The centering pin has a spring which yieldingly urges the pin away from the work.

For purpose of illustration, a typical embodiment of the invention is shown in the accompanying drawing in which Fig. 1 is a side elevation of a watchmaker's precision lathe with the improved chuck installed;

Fig. 2 is a section on line 2—2 of Fig. 4 with the chuck shown installed in the lathe;

Fig. 3 is a front end elevation of the chuck;

Fig. 4 is a top plan of the chuck; and

Fig. 5 is a partial view similar to Fig. 2 except that the centering pin is extended to operative position and the retaining cap is slightly retracted.

The lathe chosen for purpose of illustration comprises a spindle 1 which is rotated by means of a belt-driven pulley 2 attached thereto. The spindle has an axial bore 3 with a conical surface 4 at the chuck end. The body 8 of the chuck has a conical surface which fits into the conical surface 4 on the spindle and an end face perpendicular to its axis. The work piece is clamped in the chuck by a cap or ring 23 which has a flange 24 threaded on the inside to mesh with the threads on the circumference of the body 8. The cap has an axial opening 26 which is connected to a peripheral slot or opening 28 by a radial slot or opening 27. The body 8 of the chuck has an axial opening 21 and a radial groove or opening 22 on the end face. The openings on the cap can be aligned with the openings on the end face so that when the cap is slightly unscrewed a rotary work piece 20 with a staff 19 can be inserted between the cap and the end face as shown in Fig. 5 without removing the cap from the body of the chuck. When the cap is screwed onto the body of the chuck the work piece is clamped between the end face and the inner face of the cap.

The centering pin 16 has a handle 15 of slightly larger diameter attached thereto which handle extends out of the rear of the spindle and is knurled on the end. The pin is movable back and forth in the axial bore 14 when the handle is moved in the axial bore 13. The pin 16 extends into the axial bore 13 so that a spring 17 can be placed therein. The spring urges the pin rearwardly until the projection 29 on the pin contacts the body 8. In this manner the pin is normally held in retracted position so that when the staff 19 of the work piece is being placed within the opening 21, it will not contact the side of the pin. The handle can be pushed forward, compressing the spring 17 until the center contacts the staff 19 and the work is centered as shown in Figure 5.

The body of the chuck has a shape similar to a collet so that it may be used in the ordinary spindle. The body 8 has a round extended portion 9 with a groove or keyway 10 which fits over a key 11 on the axial bore of the spindle so that the chuck and the spindle rotate together. Threads 12 on the end of the extended portion 9 mesh with the thread 6 on the inside of the tube 5. The tube 5 has a handle 7 attached thereto at the rear of the spindle. By rotating the handle and holding the spindle against rotation the threads are meshed and the chuck is pulled tightly within the spindle.

To insert a gear wheel or balance wheel in the chuck the cap 24 is backed off a distance somewhat greater than the thickness of the wheel, the head and cap are turned so that the groove 22 and slot 27 extend upwardly, and the gear wheel is then dropped into the chuck, the wheel passing through the peripheral slot 28 and the ends of the shaft passing along the groove 22 and slot 27 respectively. By terminating the groove 22 and/or slot 27 just beyond the axis of the chuck, the wheel is approximately centered when it is dropped into the chuck as aforesaid. Then it can be accurately centered with the pin 15—16, after which the wheel is clamped between the opposing faces of the head and cap by threading the cap farther over the head. In this way a wheel may be quickly and accurately mounted in the chuck for polishing either end of the shaft.

It should be understood that the present disclosure is for the purpose of illustration only and that this invention includes all modifications and equivalents which fall within the scope of the appended claims.

I claim:

1. A chuck for holding a watch wheel having a shaft projecting axially from each side of the wheel, comprising a rotary head having an end face perpendicular to its axis, and a cap having a bottom wall parallel to said end face and a rim, said cap being mounted on the head axially adjustable to clamp the wheel between said face and the inner surface of the bottom wall, said bottom wall having a radial slot extending from the center thereof to accommodate one end of said shaft and said cap having a peripheral slot wider than said radial slot, the peripheral slot intersecting the radial slot and being defined by a plane through said end wall parallel to its axis and a plane through said rim perpendicular to said axis, said peripheral slot accommodating said wheel, and said head having a radial groove to accommodate the other end of said shaft whereby the wheel may be inserted into the chuck merely by backing off the cap somewhat more than the thickness of the wheel.

2. Chuck according to claim 1 wherein said head carries means to center the wheel.

3. Chuck according to claim 1 wherein said head carries a centering pin slidable along the axis of the head to center the wheel.

GERARD BOLDUC.

REFERENCES CITED

The following references are of record in the file of this patent:

UNITED STATES PATENTS

| Number | Name | Date |
|---|---|---|
| 316,912 | Preston | Apr. 28, 1885 |
| 522,930 | Church | July 10, 1894 |
| 589,872 | Stratton et al. | Sept. 14, 1897 |

FOREIGN PATENTS

| Number | Country | Date |
|---|---|---|
| 12,341 | Great Britain | 1886 |

OTHER REFERENCES

American Machinist, September 13, 1945, page 135. (Copy in Div. 52.)